May 1, 1962 W. H. BANKS 3,031,791
FISHING LURE
Filed Oct. 22, 1959

INVENTOR.
WALDO H. BANKS
BY Albert A. Mahassel
AGENT

3,031,791
FISHING LURE
Waldo H. Banks, 20 Prospect St., Hopedale, Mass.
Filed Oct. 22, 1959, Ser. No. 848,137
1 Claim. (Cl. 43—41)

This invention relates to a lure for fishing and, in particular, to a lure simulating live bait in appearance and which may be used for casting or trolling.

It is the general object of the invention to provide a lure whose main body portion is formed of a spiral spring member substantially closed at one end and open at the other. It is a further object to provide a fishing lure comprised of a coiled spring member wherein the coils are preferably somewhat spaced and of proper weight, tension and shape so as to have the appearance and action of natural live bait, and which further is adapted itself to contain bait whose odor may be imparted to surrounding waters to cause fish following said lure to strike.

It is a further object to provide a lure which will remain balanced in a substantially horizontal position as it is pulled through the water and which may be coated with a protective coating to protect against corrosion, which coating may be of any given color to attract various types of fish.

Another object is to provide a lure which comprises a spirally wound spring member having a plurality of coils, the coils being tapered to form a substantial closure at one end of said member and defining an opening of substantial size at the other end thereof, means simulating a pair of fish eyes adjacent the open end, a tail interengaged with coils at said one end, one or more hooked members adjacent said closure, weight imparting means adjacent said opening, and a plate extending obliquely forward of said opening for maintaining said lure in a substantially horizontal position as it is pulled through the water, the coils preferably being slightly spaced apart so that water entering the open end will readily carry odors from bait enclosed within the lure out through spaces between the coils. The plate may be cup-shaped and attached to the forward lower end portion of the lure to effect a wiggling action.

United States Patent No. 1,338,856 discloses a fishing lure of the type with which this invention is concerned and which comprises a spirally wound spring member whose coils form a closure at both ends thereof. Such a construction does not permit odors from enclosed bait to permeate surrounding waters to any large extent due to the fact that there is very little flow of water through the lure in operation. Any bait which is contained in the lure must be forced thereinto between the coils by bending the lure and thus the size of the bait is limited. Further, no provision is made for stabilizing the lure and it will tend to be guided with its leading end in a raised position.

The present invention provides an improved construction which is open at its leading end to permit substantially greater dissipation of odors from enclosed bait into surrounding waters thereby to attract fish more readily. Means simulating fish eyes have been provided adjacent the front open end of the lure to provide a more realistic appearing lure and properly located weights or plate members or both guide the lure in a horizontal path.

Further objects and advantages will be apparent from the following description and drawings in which.

Figures 1, 2:
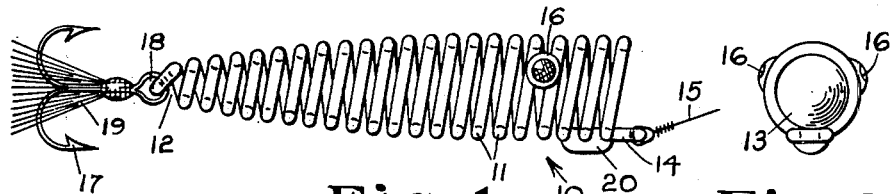
FIG. 1 is a side elevation of one form of the invention.
FIG. 2 is a right hand end view of FIG. 1.

In FIGS. 1 and 2 the lure is shown as comprising a spirally wound spring member generally indicated by the arrow 10 having a plurality of coils 11 which are tapered to form a substantial closure 12 at the tail end thereof. Approximately one half more or less of the coils may be of equal diameter as shown at the right half of FIG. 1 and terminate so as to define an opening 13 of substantial size. The spring member may terminate at the open end with an eyelet 14 to facilitate threading of the line 15. A pair of eyes 16 of colored plastic material or metal are attached in any suitable manner to one or more of the coils adjacent the open end.

The spring member is formed of corrosion resistant wire such as stainless steel or a non-corrosion resistant metal which is plated or painted or both to impart corrosion resistance and to obtain various color combinations attractive to various types of fish. Spring tension may be varied to suit a particular type of fishing.

A hooked member 17 is engaged by the last coil at the closed end which passes through an eyelet 18 in said hooked member. Threads 19 of nylon or other yarn complete the tail end. At the lower end of the first three or four coils adjacent the open end of the lure a weight 20 soldered or suitably secured to offset the lifting effect imparted by the pulling of the line 15.

Figures 3, 4:
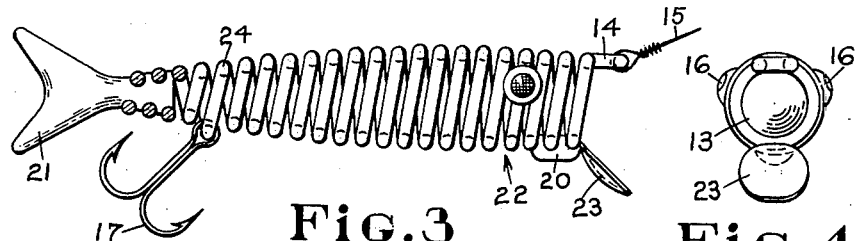
FIGS. 3 and 4 are similar views showing one modification thereof.

In FIGS. 3 and 4 the tail end is shown as comprising a vertically extending tail member 21 shaped like that of any natural bait and which may be of rubber or plastic material which is interengaged with the last few coils at the closed end. This tail member may be formed by a molding process, a plug being inserted from the open end into the coils to limit the flow of material. The coils adjacent the front end 22 of the lure are shown as being tapered slightly instead of being of constant diameter as in FIG. 1 in order to more closely simulate the appearance of a fish or natural bait. The eyelet 14 in this modification is shown as being on the upper side of the first coil instead of on the lower side as in FIG. 1, such a feature being more or less optional. Further, in addition to the weight 20 in this construction there is a plate member 23 extending forwardly of the opening 13 and at an oblique angle to the axis of the lure. This plate is preferably cup-shaped to cause a wiggling action like that of live fish, as noted in the drawing in FIG. 3. One of the coils 24 adjacent the tail end is extended along a portion thereof beyond either of its adjacent coils to facilitate attachment of the hooked member 17 into the side of the spring member.

Figures 5, 6:
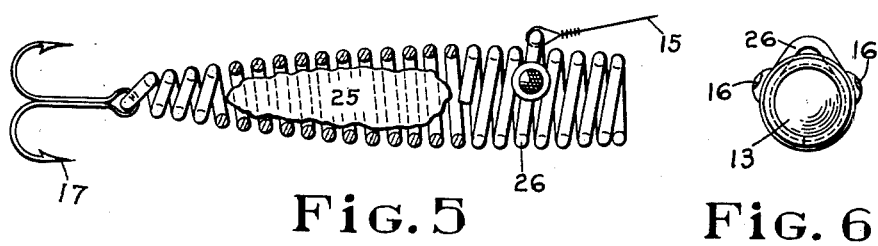
FIGS. 5 and 6 are similar views partly in section showing a still further modification.

FIG. 5 is shown partly in section to illustrate the reception of bait 25 into the lure. In this species a coil 26 adjacent the front or open end of the lure is shown as being extended outwardly along a portion thereof out of alignment with adjacent coils as an alternative and simplified method of attaching the line 15.

Figures 7, 8:
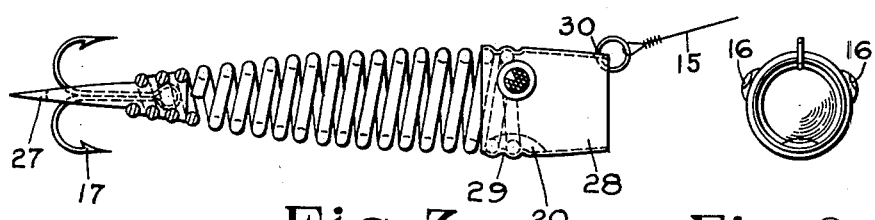
FIGS. 7 and 8 illustrate a fourth form which the invention may take.
Figure 9:
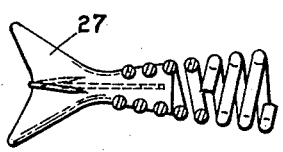
FIG. 9 is a partial plan view of the tail end of FIG. 7.

In the species of FIGS. 7 to 9 the tail end is shown as having a tail member 27 which is in a horizontal plane rather than in a vertical one as in FIG. 2. The hooked member 17 is set within the closed tail end and the tail member 27 is then molded to fasten the hooked member in place. A hollow tapered tube 28 open at both ends is threaded over the first two or three coils at the open end of the spring member as shown at 29. The tube may be either metallic or of plastic material and has the eyes 16 fixed thereto or they may be painted thereon. The line 15 is attached to the tube by means of an opening 30 therein. The weight 20 provides the additional function of holding the tube in proper orientation on the spring member.

Fastening of the line 15 in the manner shown in FIG. 5 to a coil removed from the front end of the lure tends to balance the lure and prevent it from turning over. Obviously, any one or more of the features shown in one or more of the lures illustrated may be substituted in or added to any of the others without departing from the spirit or scope of the invention.

I claim:

A fishing lure which comprises a spirally wound spring member having a plurality of coils, said coils being tapered to form a substantial closure at one end of said member and further defining an unobstructed opening of substantial size at the other end thereof, a hooked member attached to one of said coils adjacent said closure, a resilient tail interengaged with coils at said one end, means similating a pair of eyes attached to the spring member adjacent said open end, a cupped disk member fixed to one of said coils and extending obliquely forwardly of said opening, weight means attached to said coils adjacent said disk member, and means for attaching a line to said spring member at said other end in generally opposed relation to said disk member.

References Cited in the file of this patent

UNITED STATES PATENTS

| | | |
|---|---|---|
| 1,338,856 | Cote | May 4, 1920 |
| 1,967,089 | Hick | July 17, 1934 |
| 2,472,207 | Gundel | June 7, 1949 |
| 2,600,437 | Siepe | June 17, 1952 |
| 2,932,112 | Graves | Apr. 12, 1960 |